Jan. 2, 1945.  W. A. ENDTER  2,366,392
CORRECTION OF LATCH OPERATION
Filed March 17, 1944  2 Sheets-Sheet 1

WALDEMAR A. ENDTER,
INVENTOR.

BY
ATTORNEY.

Jan. 2, 1945. W. A. ENDTER 2,366,392
CORRECTION OF LATCH OPERATION
Filed March 17, 1944 2 Sheets-Sheet 2
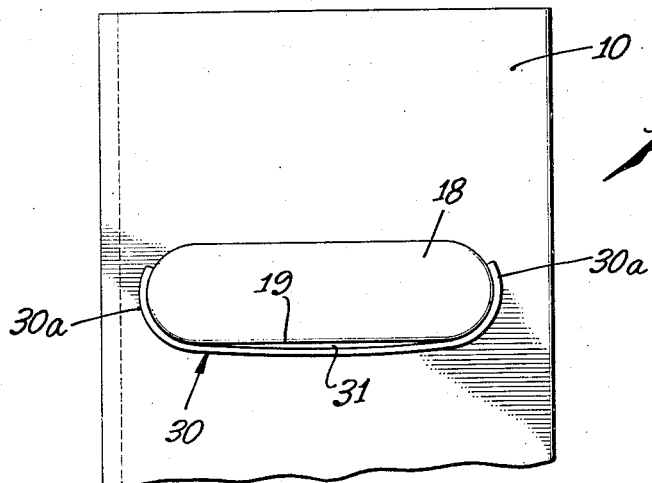
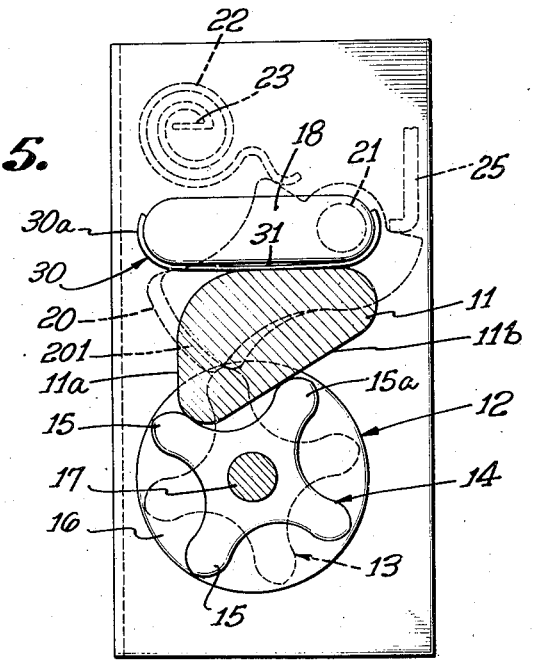
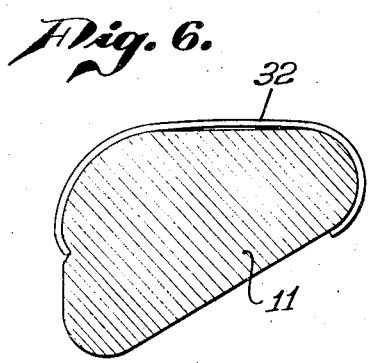
WALDEMAR A. ENDTER,
INVENTOR.
BY
ATTORNEY.

Patented Jan. 2, 1945

2,366,392

UNITED STATES PATENT OFFICE 2,366,392

CORRECTION OF LATCH OPERATION

Waldemar A. Endter, Long Beach, Calif.

Application March 17, 1944, Serial No. 526,915

11 Claims. (Cl. 292—214)

This invention relates to latch mechanisms, and has for its general object to correct the action of such mechanisms when their operation may have become faulty or inexact under such conditions as explained in the following. While applicable to various specific types and forms of latch devices, the invention is particularly concerned with correction of the action of the well-known rotary bolt type used for automobile doors, and will therefore be described typically in that adaptation.

Such latch mechanisms comprise a bolt initially movable against a keeper, and then rotatable to a position of latched engagement with the keeper. The bolt is held against releasing or anti-latching rotation out of latched engagement with the keeper, by a spring-urged cam which exerts a constant holding or advancing thrust against the bolt. Movement of the bolt in a closing direction following its initial engagement with the keeper, is resisted by the cam in that the bolt acts to displace the cam against the resistance of its spring until the cam reaches a tripping position, beyond which the cam acts against the bolt to advance or hold it in latched engagement with the keeper. Ordinarily the bolt is carried by the door, and the keeper by the stationary body post or pillar. The important considerations giving rise to the invention are that in order for the bolt to become securely engaged against the keeper and securely held in its engaged position, the door must close to an extent or distance sufficient to cause the bolt to bear against the keeper and to trip the cam, as described, so that the cam then may urge and hold the bolt against anti-latching rotation.

Since the bolt rotation, and therefore the cam operation, result from the bolt engagement with and movement relative to the keeper, proper cam action is dependent upon the maintenance of proper positional relationship between the bolt and the keeper, and specifically upon a certain proximity of the bolt toward the keeper. It happens in some instances, due for example to inaccuracies of manufacture, deformation of parts, or wearing of surfaces from usage, that the proper bolt and keeper relationship or proximity does not exist, and therefore, that the door must be closed further to cause the bolt to come into holding engagement with the keeper, and to cause the cam to trip, than otherwise would be necessary. Now if for any reason closing of the door to the proper bolt rotating or cam tripping position is prevented, or resisted say by the condition of the usual pillar-carried cushion, so that the door in any instance may not close sufficiently to bring the bolt to proper keeper-engaging position or to its cam tripping position, or appreciably beyond such position, the latch is ineffective or insecure and the door may open.

The object of this invention is to provide a simple and effective means for correcting such conditions where they may exist, without the necessity for having in any way to dismantle, repair or replace parts of the latch mechanism. Realizing that the described conditions can be corrected by bringing the keeper and bolt into proper relationship, I have devised a simple compensating means easily applicable to accomplish that end. The invention contemplates the use of a simply formed element applicable to a keeper part and having the effect of bringing the bolt and keeper into proper functional proximity where such relationship does not exist.

While the invention is applicable to various particular forms of keepers or keeper assemblies, it is particularly adaptable to, and is herein typically shown and described, as applied to a type wherein the bolt-engaged keeper part is received between a door carried bolt and a second keeper part or bearing lug also carried by the door. The compensating element may take the form of a metallic element or clip applied to one of the keeper parts and engageable by the other keeper part to assure the desired relationship between the bolt and the bolt-engaged keeper surface. Preferably the compensating element is made in the form of a spring steel clip having by virtue of its resiliency, the added advantages of maintaining a spring thrust against the bolt-engaging keeper, and of having an inherent capacity for compensating movement relative to the surface supporting the clip.

Further and more complete understanding of the invention and its various features and objects, will be had from the following detailed description of the preferred embodiment of the invention shown in the accompanying drawings, and in which:

Fig. 4 is a fragmentary view showing the spring clip applied to the keeper section or lug carried by the case structure;

Fig. 5 illustrates the corrected cam operation resulting from the effect of the spring clip; and Fig. 6 is a view similar to Fig. 4 illustrating a variational form of the invention.

Figure 1:
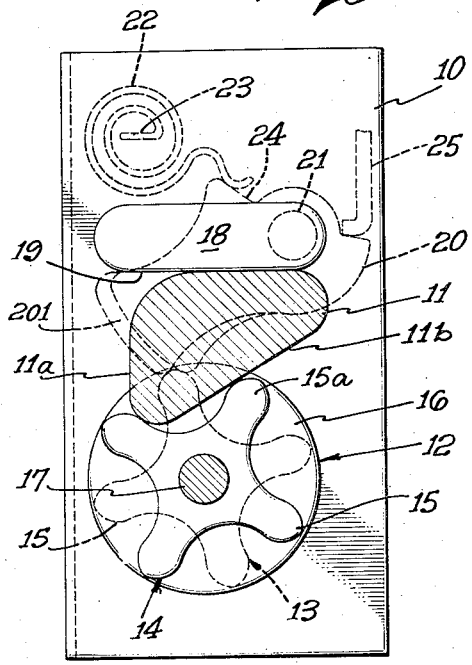
Figs. 1 and 2 are diagrammatic views showing the bolt, keeper and cam relationship, respectively at the cam tripping and home positions of a known type of rotary bolt latch mechanism.

Since rotary bolt latch mechanisms of the type illustrated in the drawings are commonly known and in wide usage, it will be necessary to show or describe only those parts with whose operation the invention is directly concerned. The latch assembly comprises a case 10 and a keeper 11 adapted to be carried by relatively movable members, for example respectively by a door and a stationary pillar, to be maintained in latched association. The keeper 11 is mounted on the door pillar in the conventional manner. The case 10 contains a rotary bolt, generally indicated at 12, comprising inner and outer sections or end portions 13 and 14 each consisting of equi-angularly spaced heads 15. The heads at the inside and outside of the usual circular flange 16, may be relatively offset, as illustrated, for reasons known to those familiar with the art. The bolt is rotatable about its shaft 17 in spaced relation to a stationary keeper part or lug 18, which also is carried by the case 10 and presents a projected bearing surface 19 engageable by the top surface of the pillar-carried keeper 11, as will appear.

The bolt 12 is maintained in latched association with the keeper 11 by one or a plurality of the somewhat conventionally illustrated differential radius cams 20 and 201 mounted for oscillatory movement on a pin 21. The cams 20 and 201 are thrust against the bolt by individual coil springs 22 (one only appearing in the views) supported at 23 inside the case and bearing against the cam shoulders 24. The cams are releasable from holding relation to the bolt by the conventional operating member 25 movable downwardly against the cam shoulders 26 to swing the cams in a clockwise direction against the resistance of springs 22.

Normally, and assuming the parts to have the proper proportions and relative positions, the latch operates as follows: With the door opened, the bolt 12 and lug 18 are withdrawn entirely from the keeper 11. As the door is closed and the bolt and lug move toward the right to receive the keeper 11 between them, one of the heads 15 of the outer bolt section 14 engages the end surface 11a of the keeper, causing the bolt to rotate counter-clockwise and the cam-engaged head of the inner bolt section 13 to displace the cams 20 and 201 upwardly against the resistance of their springs. At the position reached by the bolt just in advance of its position as shown in Fig. 1, one and the other of the cams ride over the end of the bolt head which they engage, and the cams then act against the bolt to urge it in an advancing or latching direction against surface 11b of the keeper. Also the bolt head 15a is brought into engagement with inclined keeper surface 11b to assure maintenance of the bolt in holding engagement with the keeper.

Figure 2:
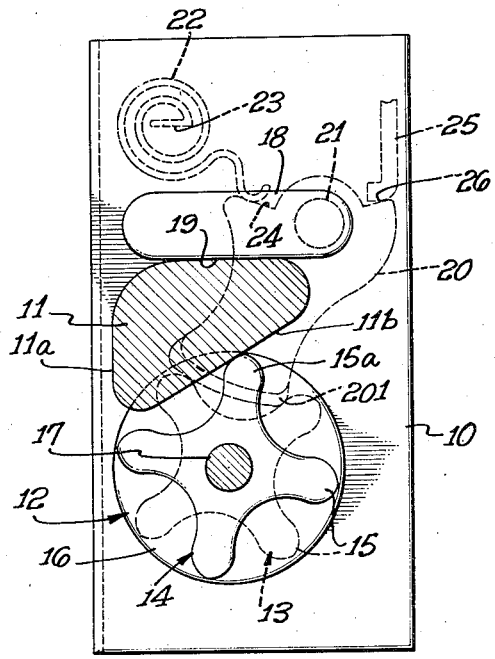

The point at which the cam 20 passes over the end of the bolt head and thereupon commences to urge instead of resist advancing rotation of the bolt, is herein referred to as the cam tripping position. The cam-created thrust of the bolt against the keeper 11 tends also to bring the keeper into snug or tight engagement with the under bearing surface 19 of the keeper lug 18. Depending upon the resistance that may be imposed, as by the usual door cushion, to further advancement of the bolt beyond the position of Fig. 1, the ultimate latched position of the bolt may be any position between that of Fig. 1 and the full home position illustrated in Fig. 2.

From the foregoing it will be understood that the existence and security of latched association between the bolt 12 and the keeper 11 (with the bolt being held by the cam against anti-latching rotation) is dependent upon advancement of the door and bolt in a closing direction a distance sufficient to bring the bolt head 15a against the inclined keeper surface and to rotate the bolt beyond the cam tripping position, since the cam must be tripped in order to hold the bolt. Now it may happen that in a given instance the condition of the door cushion may not permit closing of the door and bolt to a position corresponding to or closely approaching the full home position of Fig. 2, or that for some other reason the door may not become closed to enable the bolt to reach such position. So long as the parts have the functional relationship described with reference to Figs. 1 and 2, the latch will hold if the bolt is moved just beyond the cam tripping position. Because of manufacturing inaccuracies or defects arising through wearing and usage of the parts, the bolt and keeper 11 may not have the proper relationship required to cause the cam to trip at the intended position of bolt movement along the keeper.

Figure 3:
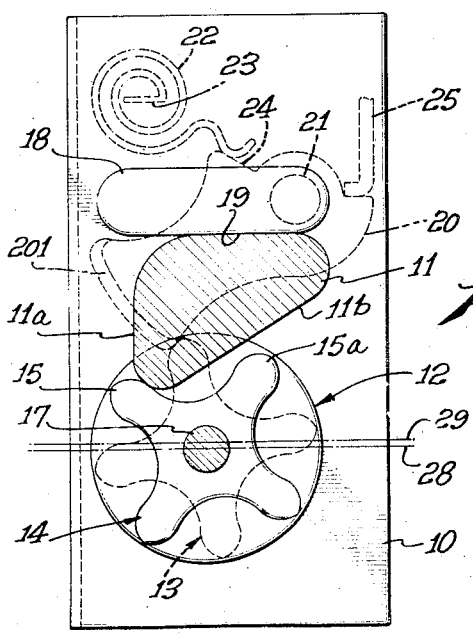
Fig. 3 is a similar view illustrating a faulty condition preventing tripping of the cam, as hereinabove discussed.

This condition is illustrated by Fig. 3 wherein the bolt axis has in effect (i. e. with relation to the keeper 11 when engaged between the bolt and lug 18) assumed a position indicated by line 28 instead of a proper or true position in the plane of line 29. Assuming the door and bolt axis to have moved in a closing direction to a position corresponding to Fig. 1, it will be observed in Fig. 3 that because of the vertical relationship between the bolt and keeper spacing, the bolt has not yet advanced to the cam tripping position, and consequently the cam is ineffective to securely hold the bolt against anti-latching rotation. Moreover, the bolt may not have rotated to the point at which the bolt head 15a is brought fully into the path of the keeper or against its surface 11b. Now if it happens, as for reasons heretofore mentioned, that the door cannot be closed or is not closed further than the position corresponding to Fig. 3, the door is free to open.

The invention contemplates correction of the condition described with reference to Fig. 3, by application to one of the keeper parts of an element which has the effect of correcting the keeper and bolt spacing, and therefore the bolt rotation and the tripping action of the cam. While the compensating element may be applied to any of the keeper surfaces so as to be productive of the later described effects, the element preferably is applied to one of the opposing surfaces of the keepers. Accordingly, in Fig. 4, the compensating element is shown to comprise a spring clip 30 suitably applied to the keeper lug 18 as by turning the ends 30a so that the clip may be slipped over and retained against the lug. The clip preferably is made of spring steel and is shaped so that it snugly grips the end of the lug 18 and has clearance at 31 from the under surface 19 of the lug to permit flexure of the clip toward or against that surface. The clip presents a smooth surface effectively resisting wear as a result of its engagement by the top surface of the keeper 11. While preferably the spring clip, primarily because of convenience, is applied to the lug 18, it is contemplated that if desired, the clip may be applied in operative relation to any of the keeper surfaces, e. g. to the top portion of the keeper 11. Thus in Fig. 6 the clip 32 is shown to overlie and engage the curved end portion of the keeper 11.

Fig. 5 illustrates the operation of the latch corrected from the condition shown in Fig. 3 by the effect of spring clip 30. As the keeper 11 is received between the bolt 12 and lug 18, the presence of the clip between the lug and the keeper 11 in effect restores the proper spacing (corresponding to line 29 in Fig. 3) between the keeper and the bolt axis. Consequently upon advancement of the bolt to its Fig. 5 position, which corresponds to Fig. 1, the bolt head will have been brought against the keeper surface 11b and the cam 20 will have passed its tripping position so that it acts against the bolt to hold it against anti-latching rotation. By reason of its spring characteristics and normal clearance at 31 from the lug, the clip acts constantly while in engagement with the keeper to thrust it in the direction of the bolt. As illustrative, the clips may be made of spring steel ranging in gage or thickness from about .032 to .042 inch.

I claim:

1. In a latch mechanism for securing together a pair of relatively movable members and including a movable bolt to be carried by one of said members, keeper means comprising a bearing projection carried by said member in spaced relation to the bolt and a second projection carried by the other of said members and receivable between the bolt and said bearing projection, said second projection having a surface in the path of the bolt and the bolt being movable along said surface and toward and against the surface as the bolt advances to latched position; the improvement comprising an element carried by one of said keeper projections and serving to project said second projection further into the path of the bolt and thereby accelerate movement of the bolt toward and against said surface with relation to the bolt travel along the surface.

2. In a latch mechanism having a movable bolt, keeper means including a keeper member having an inclined surface in the path of the bolt and along which the bolt is movable as it advances to latched position; and holding means operable to prevent anti-latching movement of the bolt when the bolt has moved a distance along said surface; the improvement comprising an element associated with said keeper means and serving to project said keeper member further into the path of the bolt and thereby accelerate said operation of the holding means with relation to the bolt travel along said surface.

3. In a latch mechanism having a rotary bolt, keeper means in the path of the bolt and along which the bolt is rotatable and bodily movable to latched position, and cam means for releasably holding said bolt in latched engagement with said keeper means, said cam means comprising a cam displaceable in one direction to a tripping position by rotation of the bolt and then being movable in an opposite and bolt holding direction upon continued rotation of the bolt; the improvement comprising an element associated with said keeper means and serving to accelerate rotation of the bolt and thereby advance the tripping position of said cam with relation to the bolt movement in a latching direction along said keeper means.

4. In a latch mechanism having a rotary bolt, keeper means in the path of the bolt and along which the bolt is rotatable and bodily movable to latched position, and cam means for releasably holding said bolt in latched engagement with said keeper means, said cam means comprising a cam displaceable in one direction to a tripping position by rotation of the bolt and then being movable in an opposite and bolt holding direction upon continued rotation of the bolt; the improvement comprising an element carried by said keeper means and serving to project further into the path of the bolt, a bolt-engaging surface of the keeper means and thereby accelerate rotation of the bolt to advance the tripping action of said cam with relation to the bolt movement in a latching direction along said keeper means.

5. In a latch mechanism having a rotary bolt, keeper means in the path of the bolt and along which the bolt is rotatable and bodily movable to latched position, and cam means for releasably holding said bolt in latched engagement with said keeper means, said cam means comprising a cam displaceable in one direction to a tripping position by rotation of the bolt and then being movable in an opposite and bolt holding direction upon continued rotation of the bolt; a metallic clip applied to said keeper means and serving to accelerate rotation of the bolt and thereby advance the tripping action of said cam with relation to the bolt movement in a latching direction along said keeper means.

6. In a latch mechanism having a rotary bolt, keeper means in the path of the bolt and along which the bolt is rotatable and bodily movable to latched position, and cam means for releasably holding said bolt in latched engagement with said keeper means, said cam means comprising a cam displaceable in one direction to a tripping position by rotation of the bolt and then being movable in an opposite and bolt holding direction upon continued rotation of the bolt; a spring element carried by and flexible relative to said keeper means, said element serving to accelerate rotation of the bolt and thereby advance the tripping action of said cam with relation to the bolt movement in a latching direction along said keeper means.

7. In a latch mechanism for securing together a pair of relatively movable members and including a rotary bolt to be carried by one of said members, keeper means comprising a bearing projection carried by said member in spaced relation to the bolt and a second projection carried in the path of the bolt by the other of said members and receivable between the bolt and said bearing projection, and a cam displaceable in one direction to a tripping position by rotation of the bolt and then being movable in an opposite and bolt advancing direction upon continued rotation of the bolt; the improvement comprising an element carried by one of said projections and serving to accelerate rotation of the bolt by bringing said second projection further into the path of the bolt and thereby advance the tripping action of said cam with relation to the bolt movement in a latching direction along said keeper means.

8. In a latch mechanism for securing together a pair of relatively movable members and including a rotary bolt to be carried by one of said members, keeper means comprising a bearing projection carried by said member in spaced relation to the bolt and a second projection carried in the path of the bolt by the other of said members and receivable between the bolt and said bearing projection, and a cam displaceable in one direction to a tripping position by rotation of the bolt and then being movable in an opposite and bolt advancing direction upon continued rotation of the bolt; the improvement comprising a metal spring clip carried by and flexible relative to one of said projections and serving to bring said second projection further into the path of the bolt and thereby accelerate rotation of the bolt after its engagement with said second projection to advance the tripping action of said cam with relation to the bolt movement in a latching direction along said keeper means.

9. In a latch mechanism for securing together a pair of relatively movable members and including a rotary bolt to be carried by one of said members, keeper means comprising a bearing projection carried by said member in spaced relation to the bolt and a second projection carried in the path of the bolt by the other of said members and receivable between the bolt and said bearing projection, and a cam displaceable in one direction to a tripping position by rotation of the bolt and then being movable in an opposite and bolt advancing direction upon continued rotation of the bolt; the improvement comprising a resilient element having inwardly turned ends and carried by one of said projections, the portion intermediate said turned ends of the element being flexible relative to a shoulder on the element-carrying projection adjacent to and opposite a shoulder on the other of said projections so that said element is flexed when engaged by the last mentioned shoulder and tends to bring said second projection further into the path of the bolt.

10. In a latch mechanism for securing together a pair of relatively movable members and including a rotary bolt to be carried by one of said members, keeper means comprising a bearing projection carried by said member in spaced relation to the bolt and a second projection carried in the path of the bolt by the other of said members and receivable between the bolt and said bearing projection, and a cam displaceable in one direction to a tripping position by rotation of the bolt and then being movable in an opposite and bolt advancing direction upon continued rotation of the bolt; the improvement comprising a resilient spring clip having rigidly supported end portions engaging said bearing and having an intermediate flexible portion engageable by said second projection so that said element tends to bring said second projection further into the path of the bolt.

11. In a latch mechanism for securing together a pair of relatively movable members and including a rotary bolt to be carried by one of said members, keeper means comprising a bearing projection carried by said member in spaced relation to the bolt and a second projection carried in the path of the bolt by the other of said members and receivable between the bolt and said bearing projection, and a cam displaceable in one direction to a tripping position by rotation of the bolt and then being movable in an opposite and bolt advancing direction upon continued rotation of the bolt; the improvement comprising a metal spring clip carried by and having curved ends extending about the ends of said bearing projection, said clip having an intermediate flexible portion engageable by an adjacent surface of said second projection to bring said second projection further into the path of the bolt.

WALDEMAR A. ENDTER.